(12) United States Patent
Hammell et al.

(10) Patent No.: US 10,771,907 B2
(45) Date of Patent: Sep. 8, 2020

(54) TECHNIQUES FOR ANALYZING CONNECTIVITY WITHIN AN AUDIO TRANSDUCER ARRAY

(71) Applicant: HARMAN INTERNATIONAL INDUSTRIES, INC., Stamford, CT (US)

(72) Inventors: Graham Hammell, Sandy, UT (US); Gerhard Pfaffinger, Regensburg (DE); Davide Di Censo, San Mateo, CA (US); Donald Joseph Butts, Westport, CT (US); Jaime Elliot Nahman, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 872 days.

(21) Appl. No.: 14/567,646

(22) Filed: Dec. 11, 2014

(65) Prior Publication Data
US 2016/0174004 A1     Jun. 16, 2016

(51) Int. Cl.
*H04R 29/00*     (2006.01)
*G06K 9/00*     (2006.01)
(Continued)

(52) U.S. Cl.
CPC ......... *H04R 29/00* (2013.01); *G06K 9/00536* (2013.01); *G06T 11/206* (2013.01);
(Continued)

(58) Field of Classification Search
CPC .............. G06K 9/00536; G06T 11/206; H04L 43/0811; H04R 2420/05; H04R 27/00; H04R 29/00; H04R 29/007; H04R 29/008
(Continued)

(56) References Cited

U.S. PATENT DOCUMENTS

| | | | |
|---|---|---|---|
| 8,381,985 B2* | 2/2013 | Ferren | G06F 3/0414 235/462.21 |
| 2011/0090318 A1* | 4/2011 | Chen | H04N 13/026 348/50 |

(Continued)

FOREIGN PATENT DOCUMENTS

| | | |
|---|---|---|
| CN | 1856186 A | 11/2006 |
| CN | 102355614 A | 2/2012 |

(Continued)

OTHER PUBLICATIONS

Adrade et al., "Digital preservation of Brazilian indigenous artworks: Generating high quality textures for 3D models", IMAGO Resoruch Group, 2011.*

(Continued)

*Primary Examiner* — James T Boylan
(74) *Attorney, Agent, or Firm* — Artegis Law Group, LLP

(57) ABSTRACT

An array of audio transducers includes an optical emitter, for example, and without limitation, a light emitting diode (LED), associated with each transducer. Simultaneous stimulation of all transducers illuminates all LED's. An imager then creates a map of the transducer array. Stimulation of a single transducer, illuminating the associated LED, creates an optical signature that imaging software uses to determine the position of the transducer within the array. The system then verifies the correspondence between each transducer and the associated driver amplifier by sequential stimulation of each transducer within the array. The system may vary the frequency of the stimulation applied to transducers that include filtering networks, known as crossovers, to validate performance. Further, the system may compute the angles between transducer assemblies that may be deployed in non-planar configurations, thus ensuring that the installation is constructed to specifications.

21 Claims, 12 Drawing Sheets

(51) Int. Cl.
*G06T 11/20* (2006.01)
*H04L 12/26* (2006.01)
*H04R 27/00* (2006.01)

(52) U.S. Cl.
CPC ........ *H04L 43/0811* (2013.01); *H04R 29/007* (2013.01); *H04R 29/008* (2013.01); *H04R 27/00* (2013.01); *H04R 2420/05* (2013.01)

(58) Field of Classification Search
USPC ........................................................ 348/139
See application file for complete search history.

(56) References Cited

U.S. PATENT DOCUMENTS

| | | | | |
|---|---|---|---|---|
| 2011/0135102 A1* | 6/2011 | Huang | .................. | H04N 7/142 381/58 |
| 2012/0092328 A1* | 4/2012 | Flaks | .................. | G02B 27/017 345/419 |
| 2012/0097012 A1* | 4/2012 | Kurihara | .............. | H04R 29/008 84/464 R |
| 2012/0281905 A1* | 11/2012 | Cheng | ................ | H04N 13/0007 382/154 |
| 2013/0307934 A1* | 11/2013 | Densham | ................ | G01S 3/802 348/46 |
| 2013/0314534 A1* | 11/2013 | Hinman | ................. | G06Q 10/08 348/143 |
| 2015/0109461 A1* | 4/2015 | Ahuja | ................. | H04N 17/002 348/187 |
| 2015/0341536 A1* | 11/2015 | Huang | ................. | H04N 5/2328 348/208.2 |
| 2016/0246767 A1* | 8/2016 | Makadia | ................. | G06T 17/10 |
| 2018/0295335 A1* | 10/2018 | Burgess | ................. | G01S 11/12 |

FOREIGN PATENT DOCUMENTS

| | | | | |
|---|---|---|---|---|
| CN | 202713583 U | 1/2013 | | |
| CN | 103229520 A | 7/2013 | | |
| EP | 2315503 A2 * | 4/2011 | ......... | H05B 37/0254 |
| FR | 2789540 * | 8/2000 | ............ | H04R 27/00 |
| WO | 2007/110477 A1 | 10/2007 | | |
| WO | WO-2007110477 A1 * | 10/2007 | ........... | H04R 29/001 |
| WO | WO-2014108784 A2 * | 7/2014 | ........ | H05B 37/0227 |

OTHER PUBLICATIONS

International Search Report for application No. PCT/USS2015/065397 dated Mar. 31, 2016.

* cited by examiner

TECHNIQUES FOR ANALYZING CONNECTIVITY WITHIN AN AUDIO TRANSDUCER ARRAY

BACKGROUND

Field of the Embodiments of the Invention

The present invention generally relates to sound system setup and, more specifically, to techniques for analyzing connectivity within an audio transducer array.

Description of the Related Art

Sound reinforcement systems are used in public spaces, such as concert venues, stadiums, theaters, and other areas where sound amplification is necessary or desirable. Such systems typically include amplifiers and audio transducers, also termed loudspeakers, in an array that endeavors to provide effective coverage to an audience, given the expected size and distribution of the audience. Some spaces, for example, concert venues, include a source focal point, the stage, from which the audio originates. The sound reinforcement system then is charged with distributing the audio across the audience. The system delivers a generally equal sound level to the audience members even though the audience members are situated with linearly decreasing distance from the stage. Other spaces, for example, stadiums hosting sporting events, may include an audio source that originates in a location, the so-called announcer's booth, which has no visual reference for the audience. In spaces of this type, the system delivers a generally equal sound level across the entire venue without reference to any visual focal point.

Transducers within a sound reinforcement system array are typically allocated into groups that address specific aspects of the audio space. For example, transducers may be located near the stage with large vertical elevation to provide sound to the portion of the audience farthest from the stage. Such transducers may receive large audio drive. Other transducers may be located near the stage with lower vertical elevation to provide sound to the portion of the audience closest to the stage. Such transducers may receive lower audio drive relative to the higher elevation transducers so that the nearer audience is not overwhelmed with sound. In general, the audio drive to each transducer has a dependency on the location of the transducer within the audience space.

Transducers are often designed to reproduce a specific frequency range. Typically ranges are termed low frequency or bass, mid-range, and high frequency or treble. Further, transducers may have electrical filters, termed crossovers, that limit the frequency applied to the transducer. In general, the audio drive to each transducer has a dependency on the intended frequency range that the transducer is supposed to reproduce. More globally, the sound reinforcement systems, themselves, typically include hundreds of transducers, where each such transducer needs to receive audio drive that is specifically tailored in terms of amplitude and frequency.

Typically, when setting up a sound reinforcement system, sound technicians install a transducer array that includes a number of transducers situated throughout a venue and a number of amplifiers. Sound technicians then connect wiring between each amplifier and one or more transducers. In some cases, a single amplifier may drive multiple transducers. Technicians verify the accuracy of the system installation by applying an audio signal to one amplifier. A second technician then searches throughout the venue to locate the transducer or transducers that respond to the signal and creates a log of the connection. Often the technicians may communicate by radio to perform system verification. The verification process may be time consuming due to the large size of venues and the typically large number of transducers. Further, system verification is prone to human error in wiring and/or documentation, and to component failure. Venues, such as stadiums, may have stationary sound systems, but are nevertheless vulnerable to errors occurring during system maintenance that may occur due to component replacement and/or documentation.

The above issues are even more problematic in cases of travelling shows, such as touring rock concerts. There, a crew may arrive at a venue, install the system within a matter of hours, then tear down and re-install in the next venue in a cycle that repeats throughout the tour. System verification may require hours of effort with technicians iteratively activating amplifiers, verifying transducer responses, and documenting connectivity. This verification cycle may require a significant portion of the allocated setup time, and yet is unavoidable because, as described above, accurately determining the connection between amplifiers and transducers is critical to achieving effective system performance.

As the foregoing illustrates, stage setup is a complicated and error-prone process that cannot be performed quickly with conventional techniques. Accordingly, what would be useful is a more effective approach for setting up and verifying sound reinforcement systems.

SUMMARY

One embodiment sets forth a non-transitory computer-readable medium storing program instructions that, when executed by a processing unit, cause the processing unit to analyze connectivity within an audio transducer array by performing the steps of applying a baseline stimulation to a plurality of amplifiers coupled to a transducer array, where each transducer in the transducer array includes an optical emitter that produces a light signal in response to the first stimulation, generating a baseline image that indicates a location associated with each transducer in the transducer array, applying a first stimulation to a first amplifier, generating a first image that indicates a first transducer in the transducer array, determining that the first amplifier drives the first transducer, comparing the baseline image to the first image to determine a first location associated with the first transducer, and generating connectivity data that indicates that the first amplifier is coupled to the first transducer and the first transducer resides at the first location.

One advantage of the disclosed technique is that coupling an optical indicator with each transducer within an array of audio transducers allows an imaging system to create a map of the array. The system then allows installation technicians to automatically verify the connectivity between the drivers and transducers within the array in a rapid and efficient manner. Thus, the disclosed technique reduces the time required for verification of the system connectivity from multiple hours to tens of seconds.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting

DETAILED DESCRIPTION

Figure 1A:
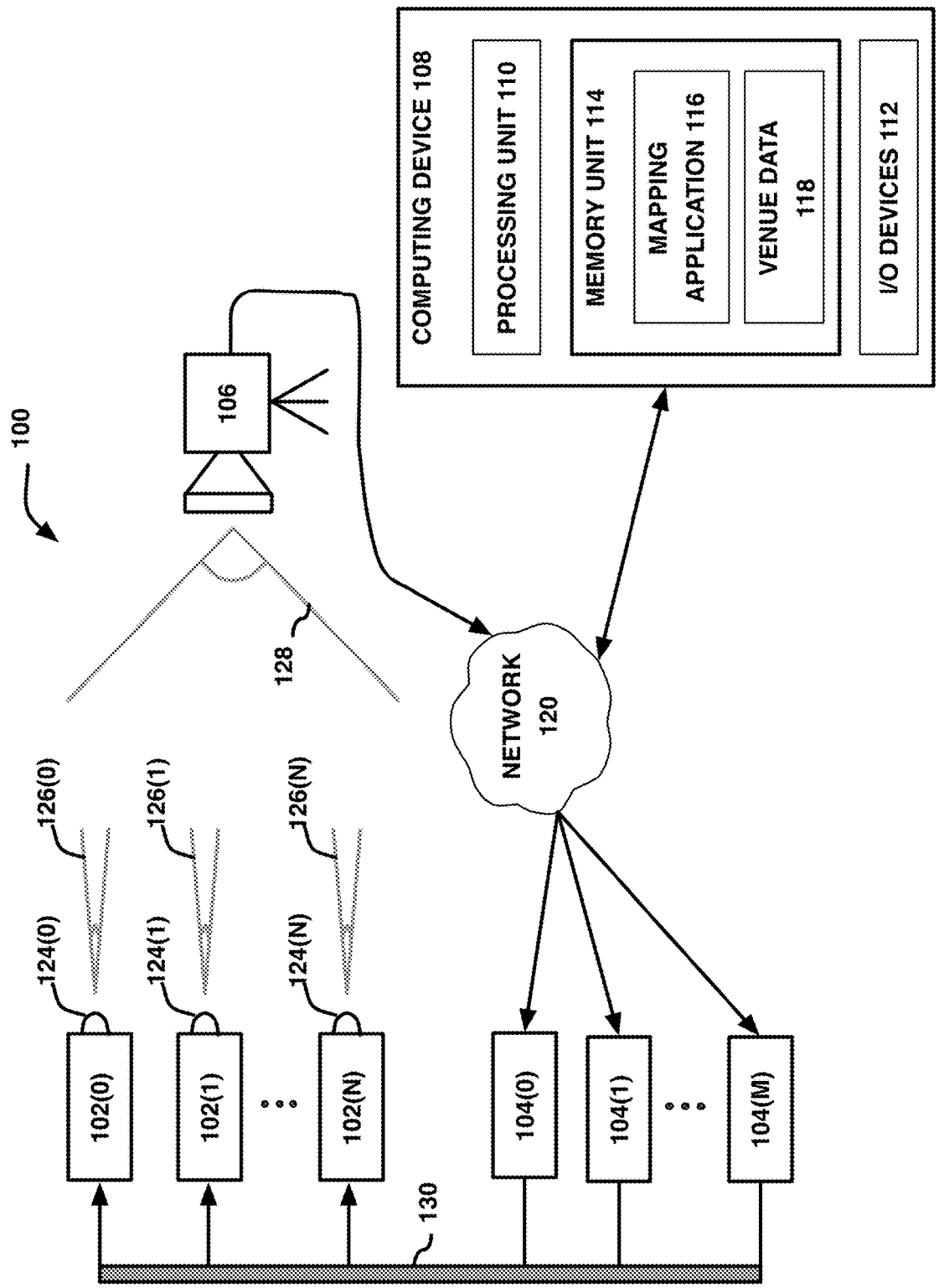
FIG. 1A illustrates a system configured to implement one or more aspects of various embodiments.

In the following description, numerous specific details are set forth to provide a more thorough understanding of certain specific embodiments. However, it will be apparent to one of skill in the art that other embodiments may be practiced without one or more of these specific details or with additional specific details FIG. 1A illustrates a system 100 configured to implement one or more aspects of various embodiments. As shown, system 100 includes, without limitation, transducers 102 and optical emitters 124 which, when illuminated, produce light signals 126. A given optical emitter 124 may be a light emitting diode (LED). In one embodiment, each optical emitter 124 may be an infrared LED. Transducers 102 and optical emitters 124 are further described below in conjunction with FIG. 2. System 100 also includes amplifiers 104 that are connected to one or more of transducers 102 via wiring assembly 130. The number of transducers 102 may be greater than the number of amplifiers 104 or the system 100 may include a one-to-one correspondence between amplifiers and transducers.

System 100 also includes imager 106, which may be a video camera, coupled to computing device 108 via network 120. Computing device 108 includes processing unit 110, input/output (I/O) devices 112, and memory unit 114. Memory unit 114 includes mapping application 116 and venue data 118.

Processing unit 110 may be any technically feasible unit configured to process data and execute software applications, including a central processing unit (CPU), a graphics processing unit (GPU), a CPU coupled to a GPU, and so forth. I/O devices 112 may include devices capable of receiving input, devices capable of producing output, as well as devices capable of communicating via network 120. Memory unit 114 may be any technically feasible storage medium, including a hard disk, a random access memory (RAM) module, or a combination thereof.

Mapping application 116 is a software application that, when executed by processing unit 110, processes images generated by imager 106 based on light signals 126. Mapping application 116 then generates a connectivity mapping that, for each different amplifier 104, indicates a connection to one or more transducers 102 within the venue and the physical location of those transducers within the venue. Venue data 118 includes data that indicates the physical geometry of the venue, the physical location of imager 106, as well as the number of amplifiers 104 and transducers 102 included in system 100, as further described below in conjunction with FIG. 1B. The physical location of imager 106 could be expressed in, for example, and without limitation, global positioning system (GPS) coordinates or venue-specific coordinates.

In operation, mapping application 116 reads venue data 118 to determine the number of amplifiers 104 and transducers 102 included in system 100. Mapping application 116 then activates all amplifiers 104 by applying a test stimulus to those amplifiers. When a given amplifier 104 is activated in this fashion, the optical emitter 124 coupled to that amplifier emits a light signal 126. This particular functionality is described in greater detail below in conjunction with FIG. 2. Imager 106 then captures an image that reflects the pattern of light signals 126 within the field of view 128 of imager 106, and then transmits the image to mapping application 116 via network 120. This image represents a baseline map of the location of all transducers 102 included in system 100. Mapping application 116 is configured to orient this baseline map relative to the position of imager 106 based on venue data 118.

Mapping application 116 then activates just one amplifier 104(0) by applying a test stimulus to that one amplifier, and imager 106 again captures an image that reflects the pattern of light signals 126. In this case, however, the pattern will include only those light signals 126 that are produced by transducers 102 connected to amplifier 104(0). Mapping application 116 then compares the previously generated baseline map with the newly-captured image generated by activating amplifier 104(0). Based on this comparison, mapping application 116 determines the placement of transducers 102 to which amplifier 104(0) is coupled within the baseline map. Since mapping application 116 orients the baseline map relative to the position of imager 106, mapping application 116 may thus determine the precise position of amplifier 104(0) relative to imager 106. Mapping application 116 then stores data that reflects the mapping between amplifier 104(0) and the transducers 102 coupled thereto, as well as the position of those transducers within the venue. In one embodiment, mapping application 116 orients the baseline map and/or the newly-captured image by identifying a reference origin within the baseline map and/or the newly-captured image. For example, mapping application 116 could identify a marker with a known location within the baseline map and/or newly capture image.

Mapping application 116 is configured to sequentially activate each single amplifier 104 in turn, and during each such cycle, imager 106 captures an image that reflects the pattern of light signals 126 generated by optical emitters 124. Mapping application 116 compares the baseline map with each such image to locate activated transducers within the baseline map. Proceeding in this manner, mapping application 116 determines the connectivity between each amplifier 104 and those transducers 102 that each amplifier 104 drives, and identifies the location of each transducer 102 within the venue. The mapping process described above is also described in greater detail below in conjunction with FIG. 1B.

Figure 1B:
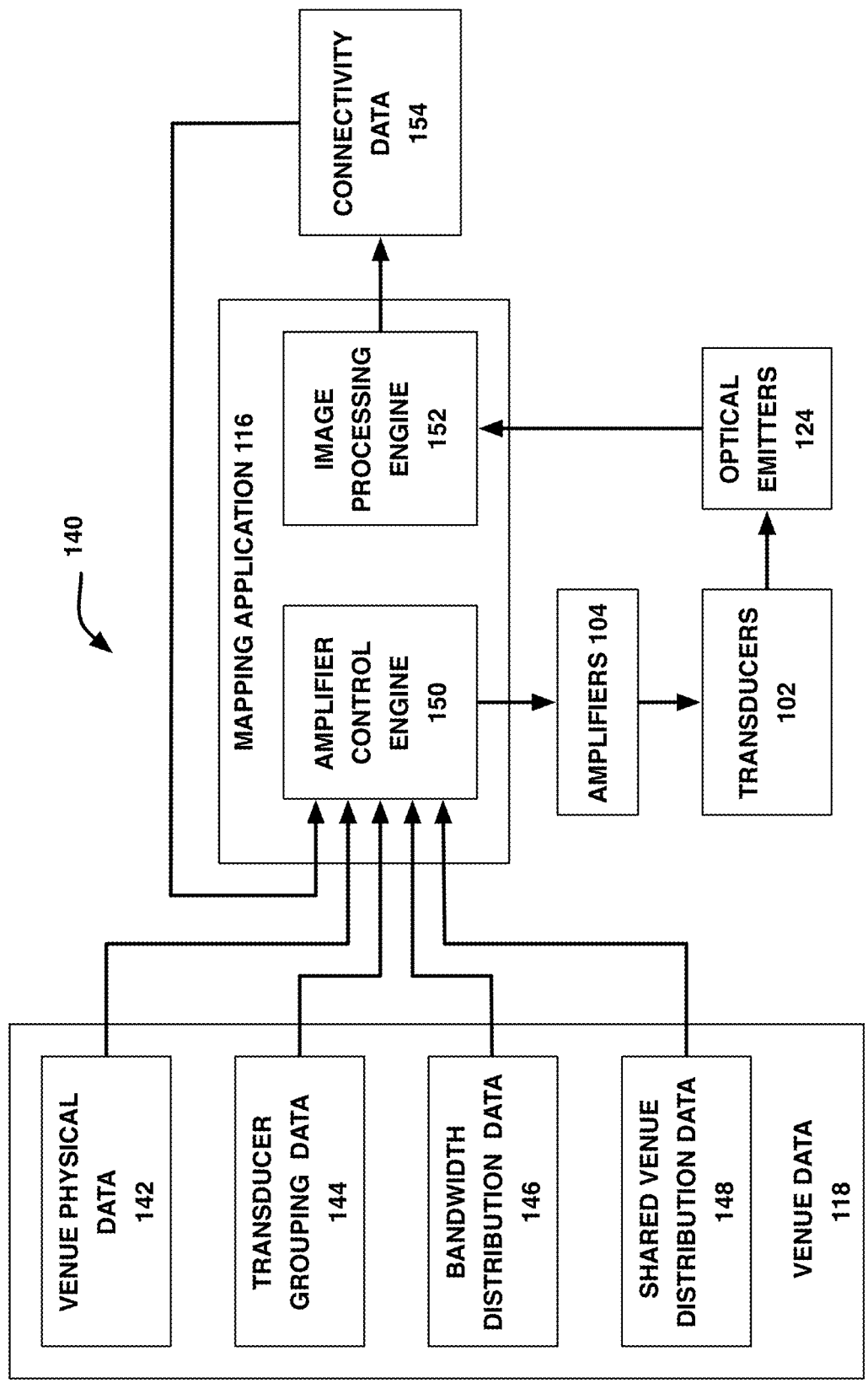
FIG. 1B illustrates data and processing stages associated with the system of FIG. 1A, according to various embodiments.

FIG. 1B illustrates data and processing stages associated with system 100 of FIG. 1A, according to various embodiments. As shown, data flow 140 includes, without limitation, venue physical data 142, transducer grouping data 144, bandwidth distribution data 146, and shared venue distribution data 148, coupled to mapping application 116. Mapping application 116 is further coupled to transducers 102, optical emitters 124, and connectivity data 154. Mapping application 116 includes amplifier control engine 150 and image processing engine 152.

Venue physical data 142 includes data descriptive of the physical characteristics of the venue in which system 100 is installed. Transducer grouping data 144 includes a catalog of all transducers that are grouped into common enclosures, as further described below in conjunction with FIG. 3. Bandwidth distribution data 146 includes data describing frequency dependent transducers, as described below in conjunction with FIGS. 2 and 3. Shared venue distribution data 148 includes data that characterizes a venue with an existing stationary sound reinforcement system in which system 100 may be integrated. Connectivity data 154 includes data that describes the location of all transducers within system 100, the connectivity between all amplifiers and transducers, as well as grouping and frequency characteristics as described below in conjunction with FIGS. 2 through 8.

Amplifier control engine 150 is a software application that, when executed by processing unit 110, reads data from venue physical data 142 and shared venue distribution data 148 to determine the number of amplifiers 104 and transducers 102 included in system 100. Amplifier control engine 150 further reads data from transducer grouping data 144 and bandwidth distribution data 146 to further determine the number of transducers 102 in common enclosures and frequency dependencies. Amplifier control engine 150 then applies stimulus to amplifiers, as described above in conjunction with FIG. 1A, to apply signal to transducers 102.

Image processing engine 152 is a software application that, when executed by processing unit 110, captures the visual images that optical emitters 124 produce in response to stimulus from amplifier control engine 150. Image processing engine 152 further compares the successive images to determine the physical location of the transducers that each amplifier 104 drives.

Image processing engine 152 may establish an origin or point of reference based upon the location of imager 106 or based upon data included in venue physical data 142. An imager 106 that includes a single camera with sufficient resolution to capture the light signal from a single emitter may capture a two-dimensional image of optical emitters 124. Alternatively, an imager 106 that includes a stereo camera may provide an improved spatial representation of the transducer array. Imager 106 may additionally include multiple stereo cameras to further improve the resolution of the location map.

Image processing engine 152 then generates connectivity data 154. Connectivity data 154 includes a global description of the physical location of all transducers and the connectivity between amplifiers 104 and transducers 102 that may be accessed by technicians via I/O devices 112. Using connectivity data 154, amplifier control engine 150 may automatically make the association between an amplifier channel and a transducer and may configure the amplifier with the correct settings in order to drive the transducer. For example, and without limitation, a transducer at an elevated location directed horizontally to the rear of the venue may be configured with a larger amplitude drive relative to a transducer at a lower elevation directed at an angle downward from horizontal, as described in conjunction with FIG. 8. In general, the amplitude of the drive applied to a transducer may have a dependency on the location of the transducer within the venue.

Figure 2:
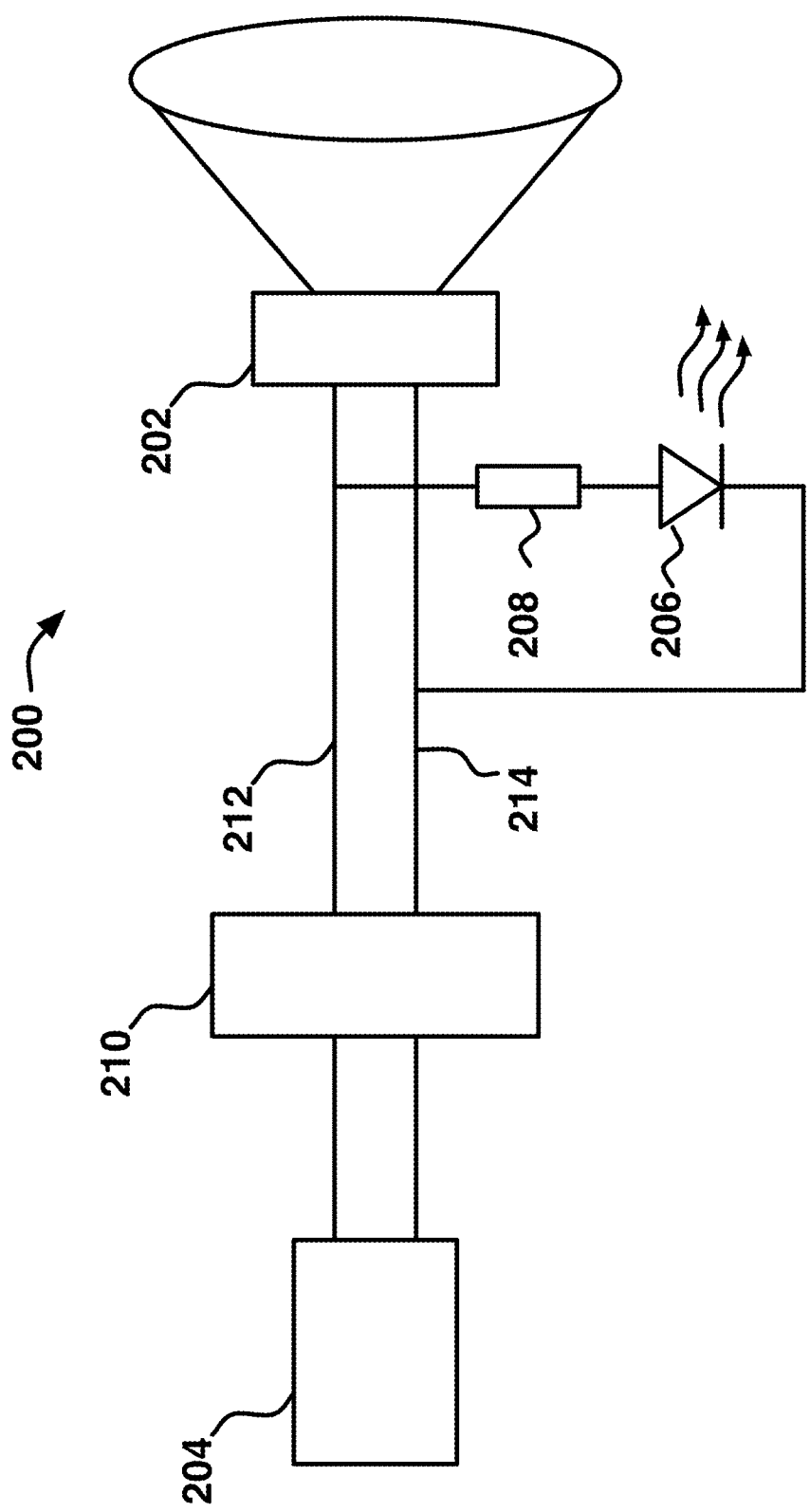
FIG. 2 is a conceptual diagram showing a single audio channel, according to various embodiments.

FIG. 2 is a conceptual diagram showing a single audio channel 200, according to various embodiments. As shown, audio channel 200 includes, without limitation, transducer 202, coupled to amplifier 204 through crossover network 210. Current limiting resistor 208 is coupled to the first supply wire 212 of transducer 202 and to optical emitter 206. Optical emitter 206 is further coupled to the second supply wire 214 of transducer 202.

Amplifier 204 produces an alternating audio signal. A typical instance of crossover 210 only passes a signal of a specified frequency range and rejects signals outside of the specified frequency range. For example, and without limitation, transducer 202 may be designed to reproduce high frequency audio signals, a device known as a tweeter. Crossover 210 is then designed to only pass high frequency audio signals and reject low and mid-range audio signals. If amplifier 204 applies a low or mid-range signal, crossover 210 blocks the signal from transducer 202.

When amplifier 204 applies a signal of the appropriate frequency range to crossover 210, the first supply wire 212 of transducer 202 transitions alternately to a higher voltage and a lower voltage with respect to the second supply wire 214 of transducer 202. When the first supply wire 212 of transducer 202 transitions to a higher voltage with respect to the second supply wire 214 of transducer 202, optical emitter 206 is forward biased and current flows in limiting resistor 208 to illuminate optical emitter 206. When the first supply wire 212 of transducer 202 transitions to a lower voltage with respect to the second wire 214 of transducer 202, optical emitter 206 is reverse biased and no current flows in limiting resistor 208. In this manner, optical emitter 206 produces pulses of light at the applied frequency.

In one embodiment, system 100 may perform a polarity analysis on optical emitter 206 by issuing a sequence of signals to optical emitter 206 and determining whether optical emitter 206 operates in a manner consistent with a correctly wired optical emitter. In doing so, amplifier control engine 150 transmits a first signal to optical emitter 206 with alternating power. Image processing engine 152 analyzes the optical output of optical emitter 206 to determine whether optical emitter 206 outputs alternating bursts of light. Assuming optical emitter 206 does, in fact, output light in the expected manner, amplifier control engine 150 transmits a second signal to optical emitter 206 with power that alternates between zero and a negative value, and then transmits a third signal to optical emitter 206 with power that alternates between zero and a positive value. Image processing engine 152 analyzes the output of optical emitter 206 in response to the second and third signals. When optical emitter 206 emits no light in response to the second signal, and emits continuous light in response to the third signal, image processing engine 152 determines that optical emitter 206 is wired with correct polarity. If optical emitter 206 emits light in response to the second signal and no light in response to the third signal, optical emitter 206 may be wired with reverse polarity. The aforementioned technique provides a simple way to test the polarity of optical emitter 206.

In another embodiment of the present invention, system 100 may effect continuous monitoring of the performance of crossover 210 after system installation by analyzing the light output of optical emitter 206 during system operation.

Audio channel 200 may be configured, through the functionality of crossover 210, to respond to stimulus of a specific frequency range and reject stimulus not within the specific frequency range. Amplifier control engine 150 when invoked by processing unit 110, may apply a stimulus of a specified frequency range to one instance of amplifiers 104. If the driven instance of amplifier 104 is coupled to an audio channel 200 configured to reproduce the specific frequency, imager 106 captures a light signal 126 that indicates a connectivity that matches the applied stimulus to a correctly configured transducer.

Alternatively, if the driven instance of amplifiers 104 is coupled to an audio channel 200 configured to reject the specific frequency range, imager 106 captures a light pattern that may indicate an incorrect connectivity, thus identifying a potential problem with the installation. In this manner, image processing engine 152 may generate data that not only identifies locations of all transducers in system 100 and connectivity between amplifiers, but also identifies correct functionality of frequency dependent transducers.

Figure 3:
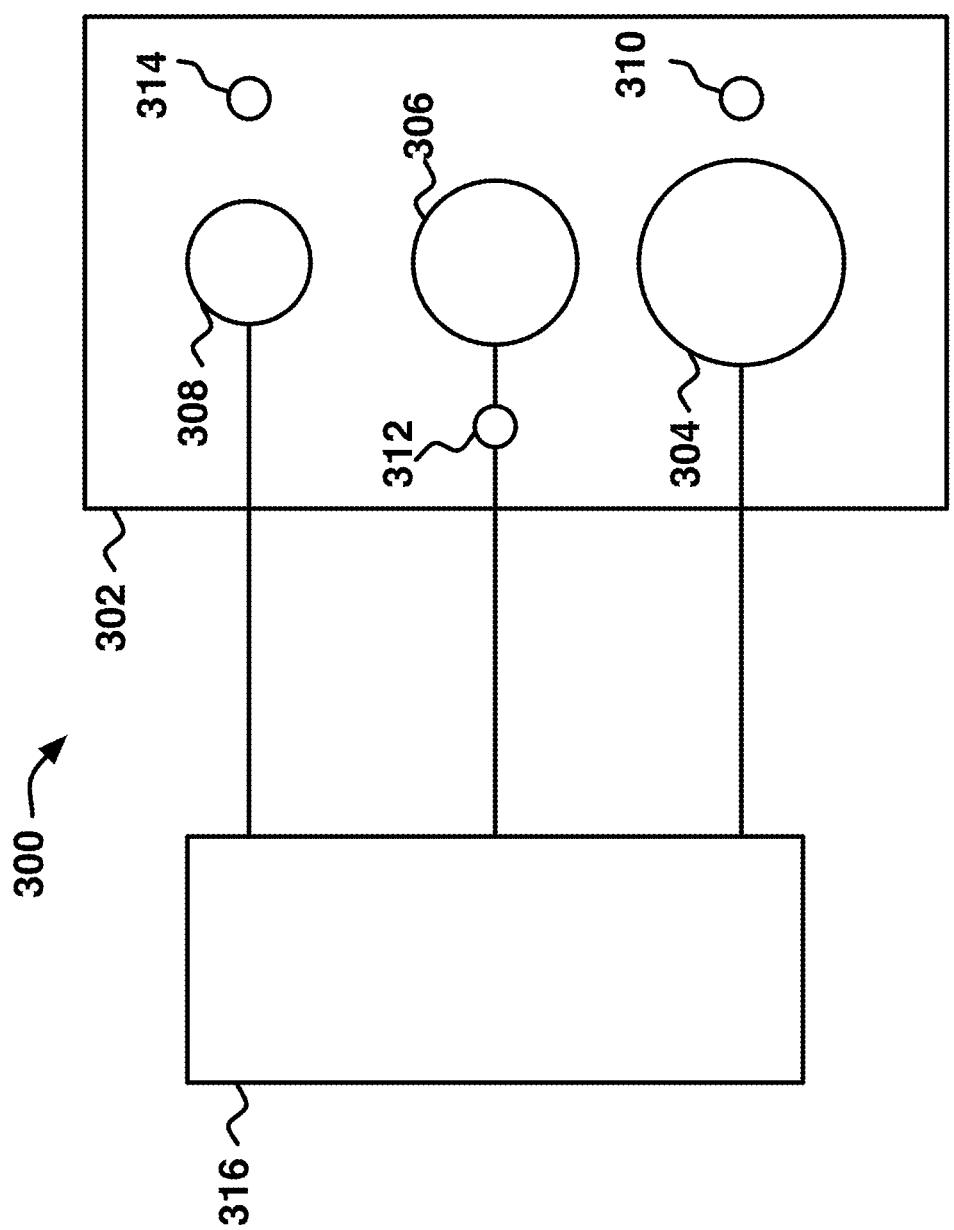
FIG. 3 is a conceptual diagram showing an assembly that includes multiple audio channels within a single transducer enclosure, according to various embodiments.

FIG. 3 is a conceptual diagram showing an assembly 300 that includes multiple audio channels, according to various embodiments. As shown, assembly 300 includes, without limitation, transducer enclosure 302 and amplifiers 316. Transducer enclosure 302 further includes transducer 304 and an associated optical emitter 310, transducer 306 and an associated optical emitter 312, and transducer 308 and an associated optical emitter 314.

Assembly 300 may be deployed as an element within a larger array of transducers. Further, transducer enclosure 302 may include transducers of varying frequency ranges. For example, and without limitation, transducer 304 may produce a low frequency range and may be coupled with a low frequency crossover as described above in conjunction with FIG. 2, while transducers 306 and 308 may produce mid-range and high frequency ranges, respectively, and may be coupled with mid-range and high frequency crossovers, respectively.

The geometric arrangement of the optical emitters 310, 312, and 314 in transducer enclosure 302 may be asymmetrical, as shown, to allow image processing engine 152 to determine the physical orientation of transducer enclosure 302.

Figure 4:
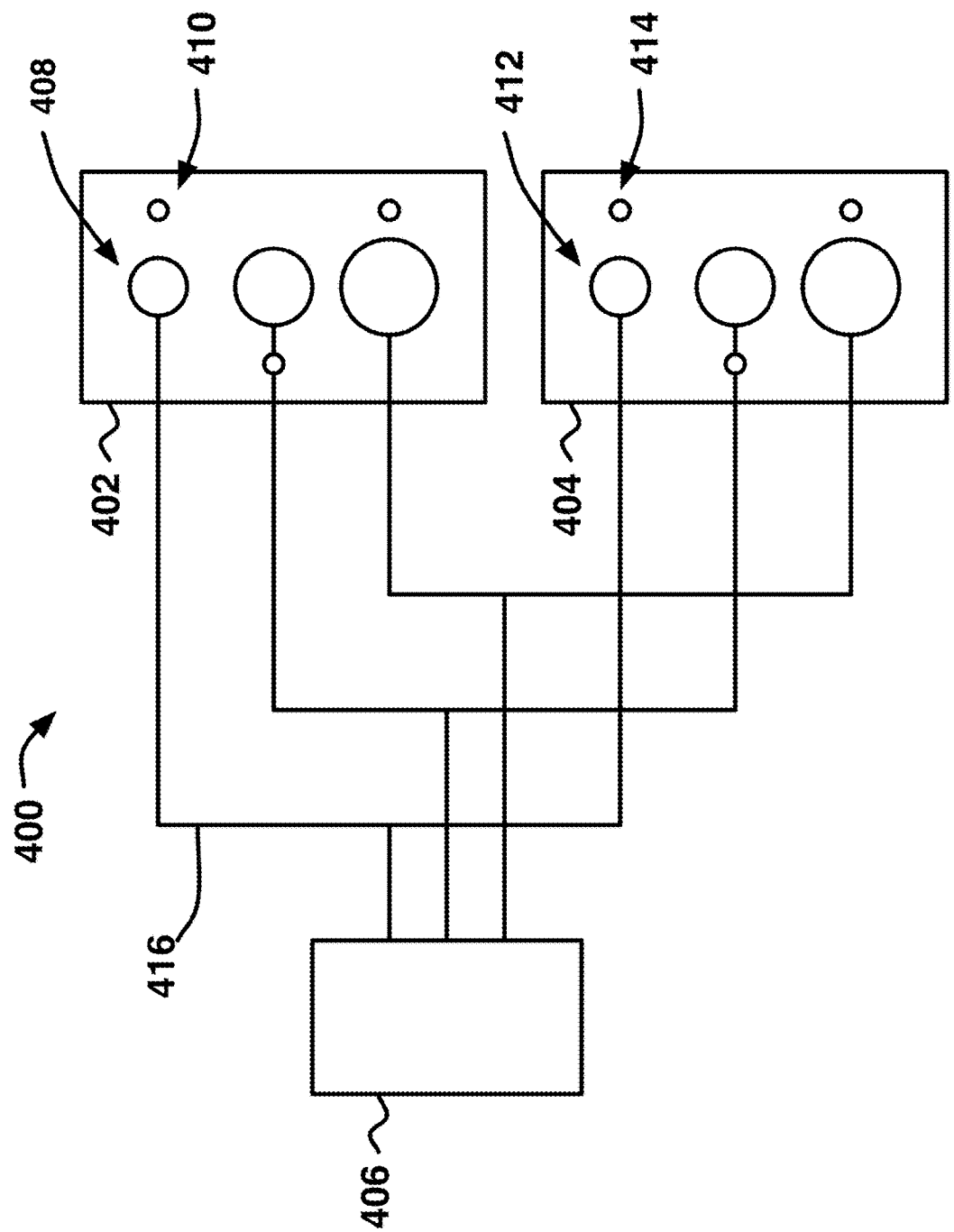
FIG. 4 is a conceptual diagram showing an assembly that includes multiple audio channels within multiple transducer enclosures, according to various embodiments.

FIG. 4 is a conceptual diagram showing an assembly 400 that includes multiple audio channels including multiple transducer enclosures 402 and 404, according to various embodiments. As shown, assembly 400 includes, without limitation, transducer enclosure 402 and transducer enclosure 404 coupled to amplifiers 406. Transducer enclosure 402 is an enclosure as described above in conjunction with FIG. 3 and includes transducer 408 and an associated optical emitter 410. Transducer enclosure 404 is an enclosure as described above in conjunction with FIG. 3 and includes transducer 412 and an associated optical emitter 414.

Assembly 400 illustrates an instance where amplifiers 406 stimulate multiple transducers connected in parallel. When amplifiers 406 provide stimulation at interconnection 416, both transducer 408 and transducer 412 receive the stimulation and optical emitters 410 and 414 both illuminate.

Figure 5:
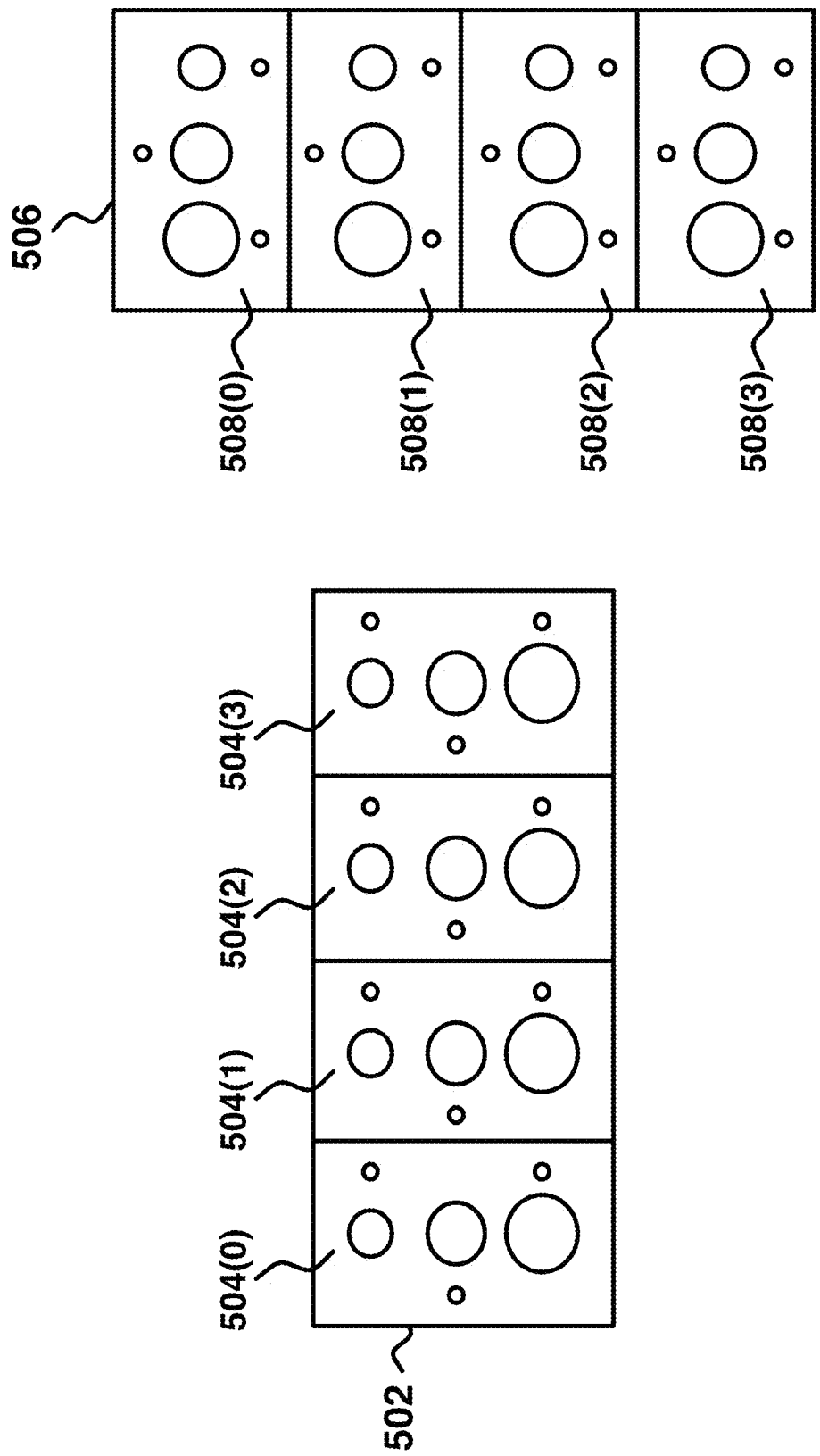
FIG. 5 is a conceptual diagram showing audio transducer assemblies that include multiple transducer enclosures, according to various embodiments.

FIG. 5 is a conceptual diagram showing audio transducer assemblies 502 and 506 that includes multiple audio channels within multiple enclosures, according to various embodiments. As shown, transducer assembly 502 includes, without limitation, transducer enclosures 504(0), 504(1), 504(2), and 504(3). Further, transducer assembly 506 includes, without limitation, transducer enclosures 508(0), 508(1), 508(2), and 508(3).

Transducer enclosures 504 and 508 are described in detail above in conjunction with FIG. 3. Transducer assembly 502 includes transducer enclosures 504 oriented vertically. Transducer assembly 506 includes transducer enclosures 508 oriented horizontally.

Although transducer assemblies 502 and 506 depict assemblies including four enclosures, persons skilled in the art will understand that any number of enclosures, and any number of transducers in any orientation are within the scope of the present invention.

Figure 6:
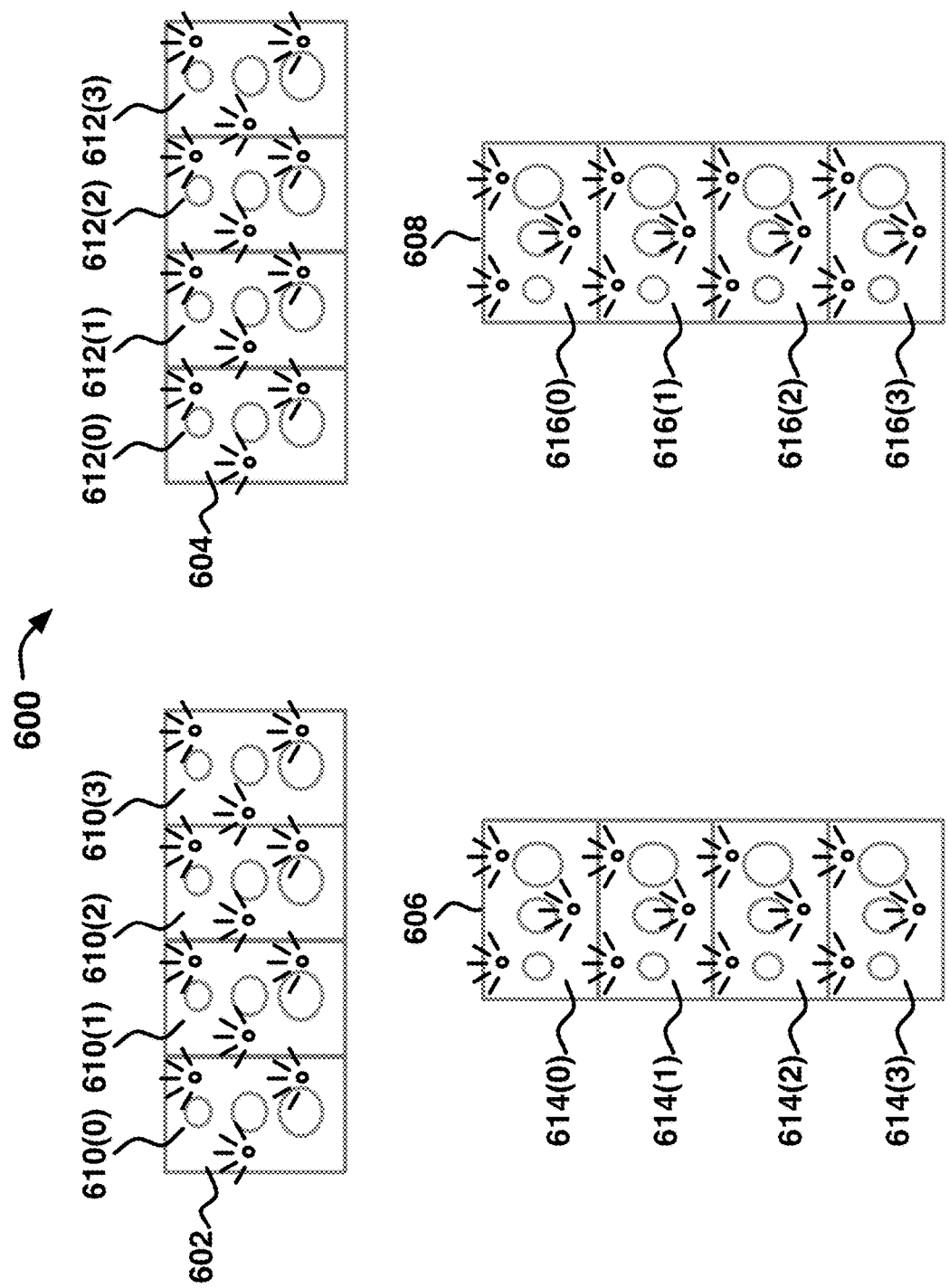
FIG. 6 is a conceptual diagram showing a fully illuminated audio transducer array, according to various embodiments.

FIG. 6 is a conceptual diagram showing a fully illuminated audio transducer array 600, according to various embodiments. As shown, audio transducer array 600 includes, without limitation, transducer assemblies 602, 604, 606, and 608. Transducer assembly 602 includes, without limitation, transducer enclosures 610(0), 610(1), 610(2), and 610(3). Transducer assembly 604 includes, without limitation, transducer enclosures 612(0), 612(1), 612(2), and 612(3). Transducer assembly 606 includes, without limitation, transducer enclosures 614(0), 614(1), 614(2), and 614(3). Transducer assembly 608 includes, without limitation, transducer enclosures 616(0), 616(1), 616(2), and 616(3).

Audio transducer array 600 is depicted in a state where all optical emitters 124 associated with each constituent transducer 102 within the array 600 are illuminated. This state occurs when amplifier control engine 150 applies stimulation to each amplifier 104 in system 100, as described in detail above in conjunction with FIG. 1. Imager 106 then detects the light signal 126 of all the transducers 102 and transmits the image data to image processing engine 152. Image processing engine 152 then creates the map of the locations of all transducers 102 and stores the location data in connectivity data 154.

Although audio transducer array 600 illustrates a particular configuration of transducers, persons skilled in the art will understand that any configurations including any numbers of transducers are within the scope of the present invention.

Figure 7:
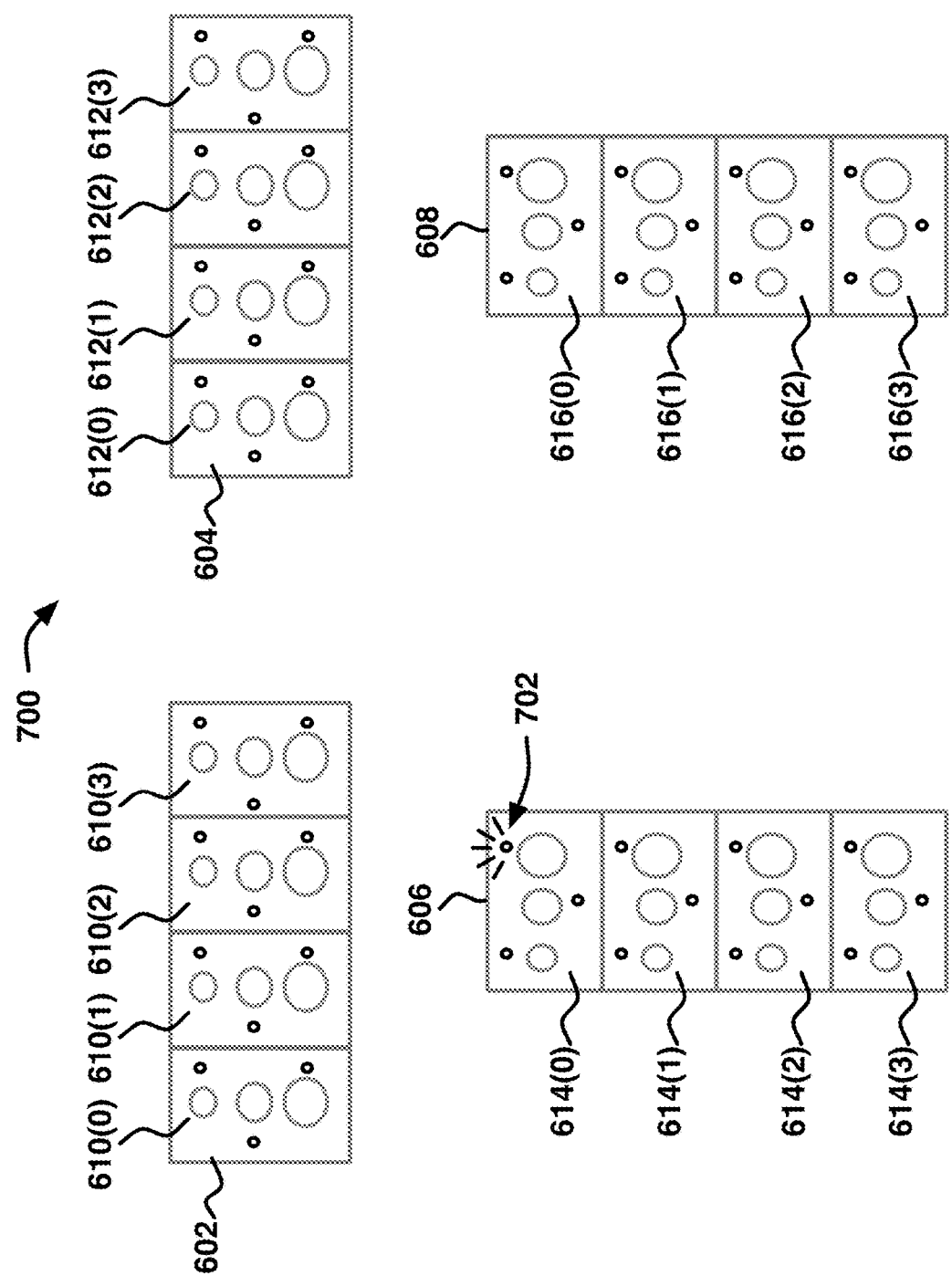
FIG. 7 is a conceptual diagram showing a single illuminated optical emitter within an audio transducer array, according to various embodiments.

FIG. 7 is a conceptual diagram showing a single illuminated optical emitter 702 within an audio transducer array 700, according to various embodiments. As shown, audio transducer array 700 includes, without limitation, the same elements as audio transducer array 600 described above in conjunction with FIG. 6. In audio transducer array 700, however, only optical emitter 702 is illuminated. This state results when amplifier control engine 150 applies stimulation only to one instance of amplifiers 104 in the system. Imager 106 then captures the pattern created by the single illuminated optical emitter 702 and transmits the pattern information to image processing engine 152 via network 120. From the pattern created by optical emitters 124, image processing engine 152 determines the exact location of the transducer within transducer assembly 606 associated with optical emitter 702 to the precision of imager 106. Image processing engine 152 further captures the connectivity between the one instance of amplifiers 104 and the transducer within enclosure 614(0) associated with optical emitter 702. Image processing engine 152 then stores the acquired data in connectivity data 154.

Amplifier control engine 150 may sequentially apply stimulation to each instance of amplifiers 104, in turn. Imager 106 then captures the pattern created by each illuminated optical emitter 124. As above, image processing engine 152 determines the location of each transducer and the connectivity data between each instance of amplifiers 104 and the transducer associated with each illuminated optical emitter 124. Image processing engine 152 then stores the acquired data in connectivity data 154.

Figure 8:
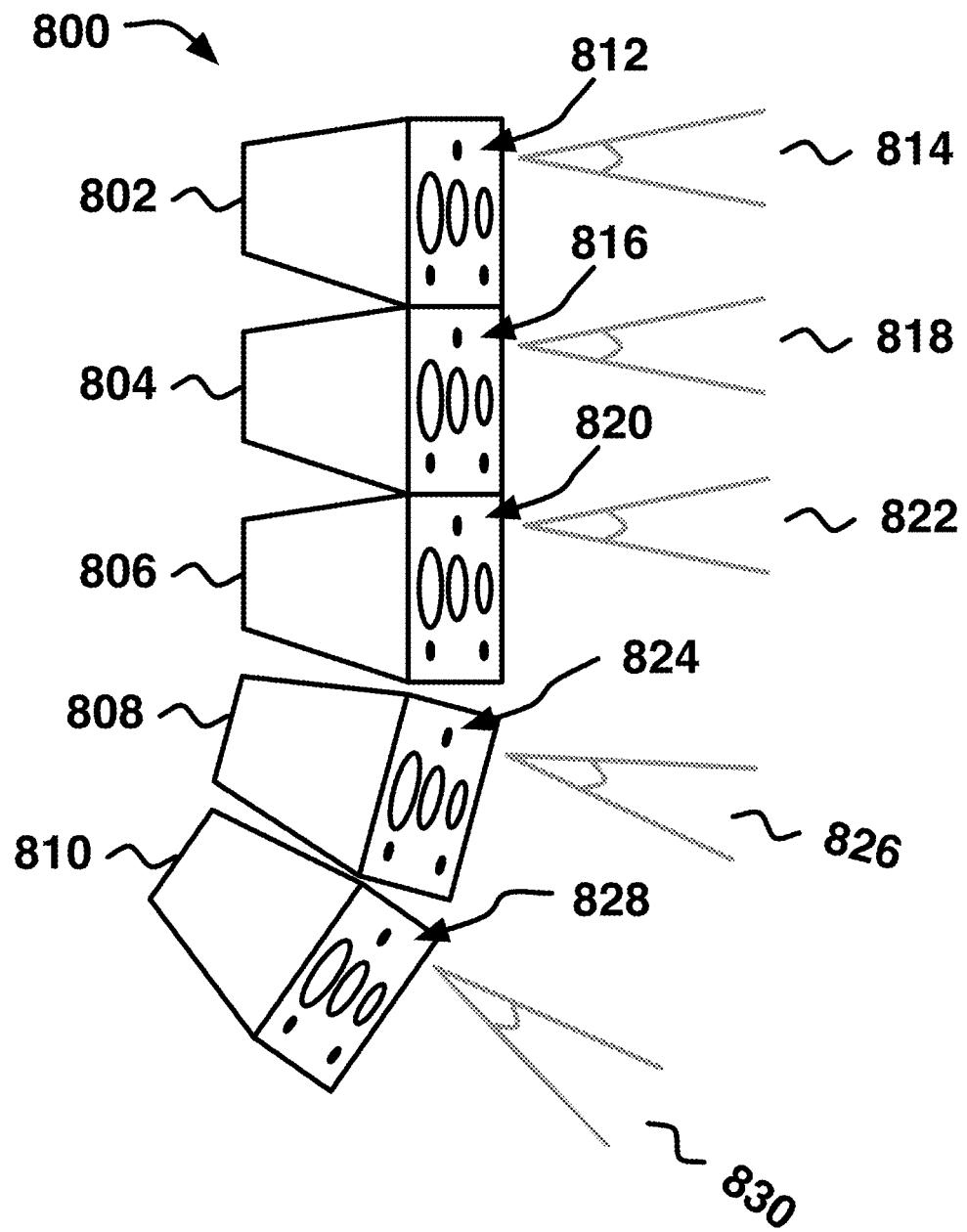
FIG. 8 is a conceptual diagram showing a vertically oriented audio transducer assembly, according to various embodiments.

FIG. 8 is a conceptual diagram showing a vertically oriented audio transducer assembly 800, according to various embodiments. As shown, audio transducer assembly 800 includes, without limitation, transducer enclosures 802, 804, 806, 808, and 810 suspended in a vertical orientation. Transducer enclosure 802 includes illuminated optical emitter 812 which, when stimulated, produces light output 814. Transducer enclosure 804 includes illuminated optical emitter 816 which, when stimulated, produces light output 818. Transducer enclosure 806 includes illuminated optical emitter 820 which, when stimulated, produces light output 822. Transducer enclosure 808 includes illuminated optical emitter 824, which, when stimulated, produces light output 826. Transducer enclosure 810 includes illuminated optical emitter 828 which, when stimulated, produces light output 830.

Imager 106 then captures the pattern created by light outputs 814, 818, 822, 826, and 830 and transmits the pattern information to image processing engine 152 via network 120. Image processing engine 152 may then compute the vertical distances between optical emitter 812 and optical emitter 816, between optical emitter 816 and optical emitter 820, between optical emitter 820, between optical emitter 824, and between optical emitter 824 and optical emitter 828.

Using the vertical distance measurements, image processing engine 152 may further model the geometry of transducer assembly audio to determine the angles from vertical at which enclosures 802, 804, 806, 808, and 810 are mounted. In doing so, image processing engine 152 may generate a three dimensional model that reflects the position and angles associated with the aforementioned enclosures by placing simulated versions of those enclosures into a three dimensional coordinate space. For a given enclosure, the angle from vertical may be used to determine the amplitude of the drive stimulus. For example, and without limitation, in a transducer assembly as illustrated in FIG. 8, amplifier control engine 150 may apply a larger amplitude drive stimulus to enclosures 802, 804, and 806 in order to project audio to that portion of the audience at a greater distance from the source. Further, amplifier control engine 150 may apply a reduced amplitude drive stimulus to enclosures 808, and 810 so that the portion of the audience at a lesser distance from the source may not be overwhelmed. In this manner, image processing engine 152 may afford further verification of the accuracy of the audio system installation.

Figure 9:
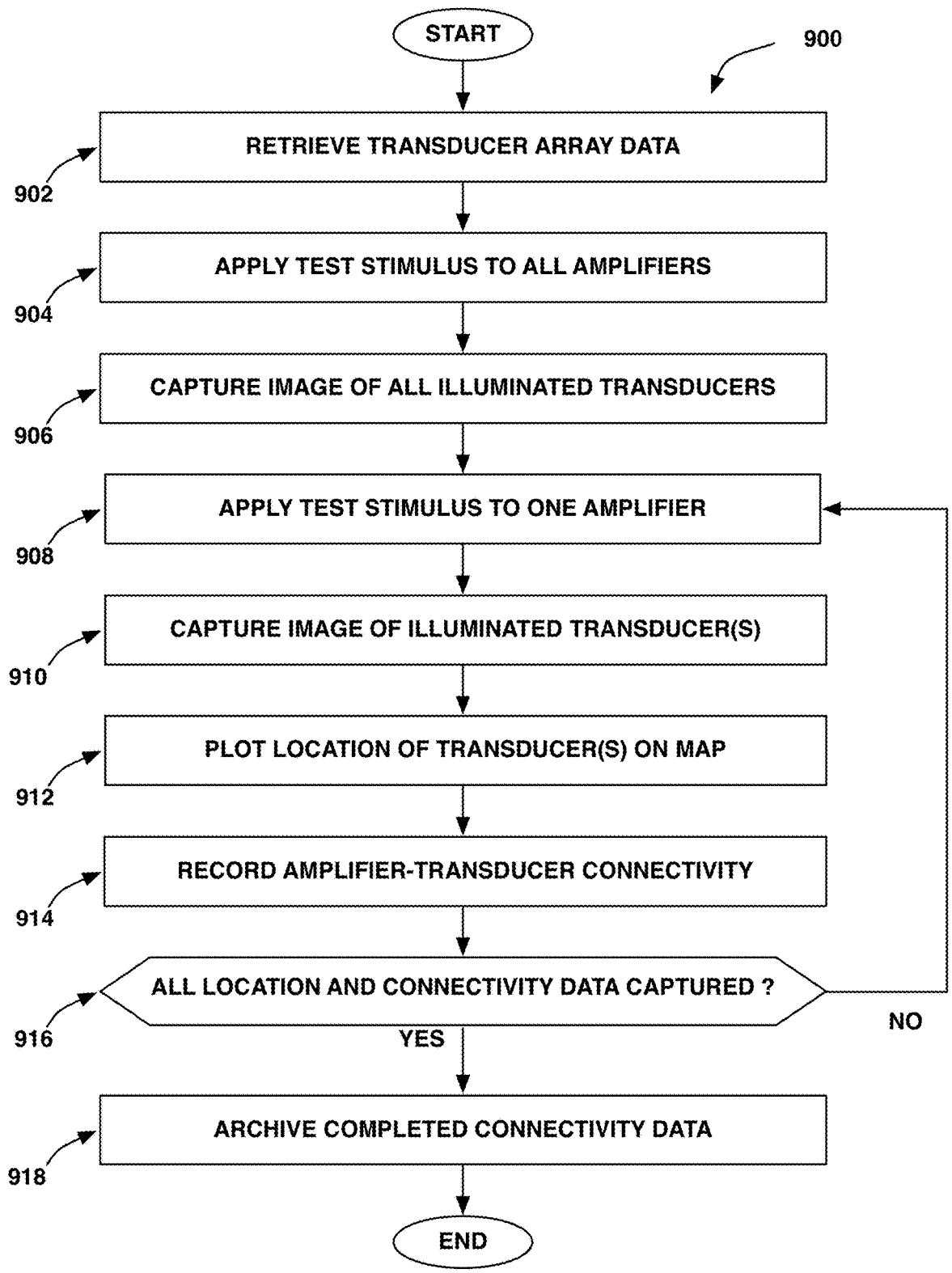
FIG. 9 is a flow diagram of method steps for generating a connectivity mapping for an audio transducer array, according to various embodiments.

FIG. 9 is a flow diagram of method steps for generating a connectivity mapping of an audio transducer array, according to various embodiments. Although the method steps are described in conjunction with the systems of FIGS. 1-8, persons skilled in the art will understand that any system configured to perform the method steps, in any order, is within the scope of the present invention.

As shown, a method 900 begins at step 902, where amplifier control engine 150 receives the specifications of the transducer array from the sound technician or other user. At step 904, amplifier control engine 150 applies stimulus to all amplifiers 104 included in system 100 in order to illuminate the optical emitters 124 associated with all transducers 102. At step 906, image processing engine 152 captures an image of all the illuminated optical emitters 124 to generate a map of the transducer distribution.

At step 908, amplifier control engine 150 applies stimulus to a single amplifier included in system 100. At step 910, image processing engine 152 captures an image of the illuminated optical emitter 124 that responds to the stimulus to determine the geometric location of the transducer 102 within the previously generated map of the transducer distribution. In a configuration in which multiple transducers are driven in parallel by a single amplifier 104, multiple transducers may be illuminated when the single amplifier is stimulated. At step 912, image processing engine 152 plots the location of the illuminated transducers. At step 914, image processing engine 152 records the connectivity between the amplifier 104 applying stimulus and the transducer 102 responding to the stimulus.

At step 916, image processing engine 152 determines whether the connectivity between all amplifiers 104 and transducers 102 has been included in the transducer map. If, at step 916, image processing engine 152 determines that the connectivity between all amplifiers 104 and transducers 102 has not been included in the transducer map, the method 900 returns to step 908, where amplifier control engine 150 applies stimulus to another amplifier included in system 100. If, at step 916, image processing engine 152 determines that the connectivity between all amplifiers 104 and transducers 102 has been included in the transducer map, then method 900 proceeds to step 918 where image processing engine 152 archives the map of location and connectivity of all amplifiers 104 and transducers 102. The method then ends.

Figure 10:
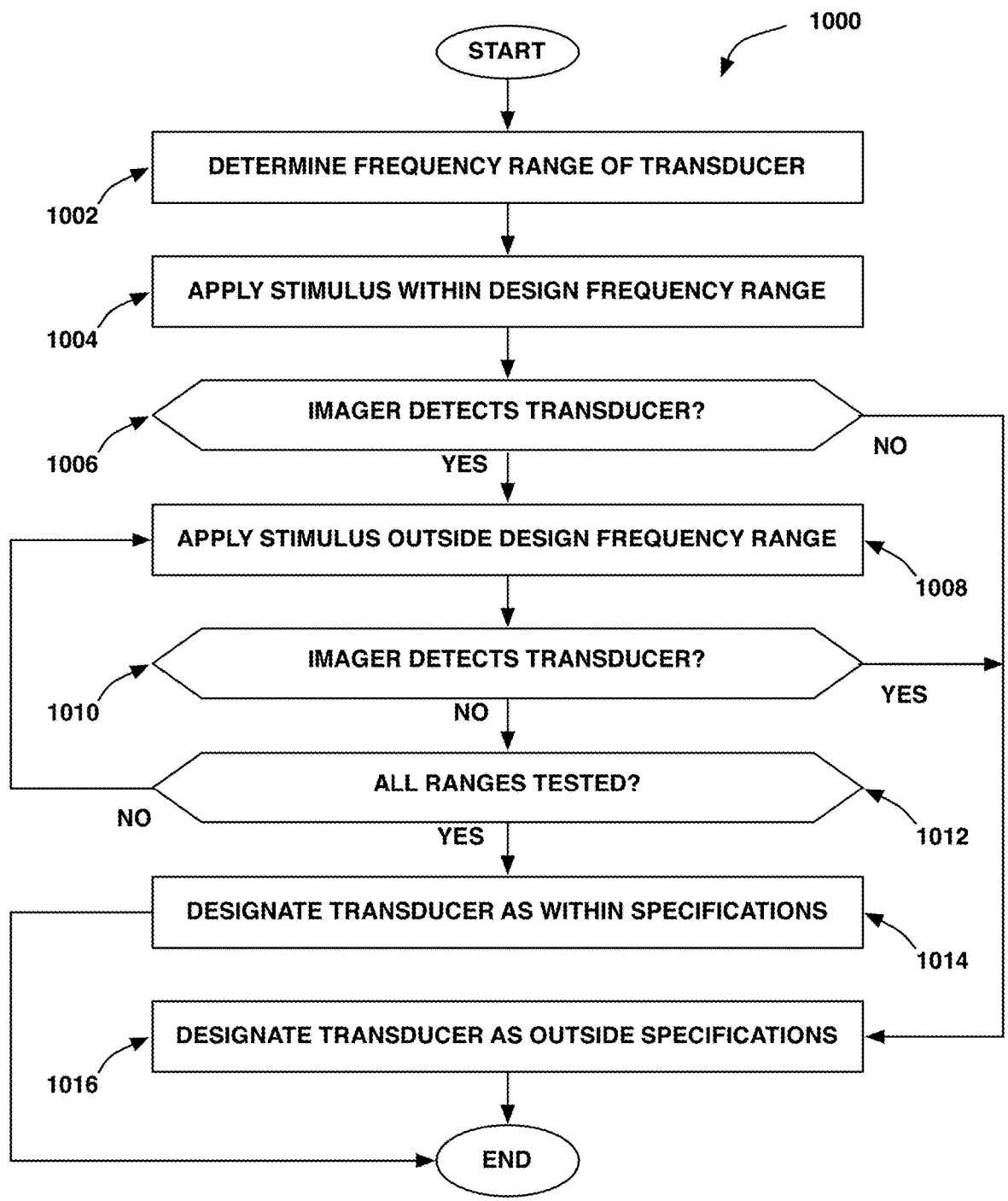
FIG. 10 is a flow diagram of method steps for analyzing transducer performance within an audio transducer array, according to various embodiments.

FIG. 10 is a flow diagram of method steps for analyzing transducer performance within an array, according to various embodiments. Although the method steps are described in conjunction with the systems of FIGS. 1-8, persons skilled in the art will understand that any system configured to perform the method steps, in any order, is within the scope of the present invention.

As shown, a method 1000 begins at step 1002, where amplifier control engine 150 reviews the specifications of system 100 to determine the frequency range of a specific instance of transducer 102. At step 1004, amplifier control engine 150 applies a stimulus that is within the specifications of the specific instance of transducer 102 to the amplifier associated with the specific transducer.

At step 1006, image processing engine 152 determines whether imager 106 has captured the expected response from the optical emitter associated with the specific transducer. The specific instance of transducer 102 is expected to respond to stimulus that is within specifications. If, at step 1006, image processing engine 152 determines that imager 106 has not captured the expected response from the optical emitter associated with the specific instance of transducer 102, then method 1000 proceeds to step 1016, where image processing engine 152 designates that the specific instance of transducer 102 is not operating within specifications. The method then ends.

If, at step 1006, image processing engine 152 determines that imager 106 has captured the expected response from the optical emitter associated with the specific instance of transducer 102, then method 1000 proceeds to step 1008. At step 1008, applies a stimulus that is not within the specifications of the specific instance of transducer 102 to the amplifier associated with the specific instance of transducer 102.

At step 1010, image processing engine 152 determines whether imager 106 has captured the expected response from the optical emitter associated with the specific instance of transducer 102. Specifically, the specific instance of transducer 102 is expected to be unresponsive to stimulus not within specifications. If, at step 1010, image processing engine 152 determines that imager 106 has captured a response from the optical emitter associated with the specific instance of transducer 102, then method 1000 proceeds to step 1016, where image processing engine 152 designates that the specific instance of transducer 102 is not operating within specifications. The method then ends.

If, at step 1010, image processing engine 152 determines that imager 106 has captured no response from the optical emitter associated with the specific instance of transducer 102, then method 1000 proceeds to step 1012, where image processing engine 152 determines whether all frequency ranges have been tested. If, at step 1012, image processing engine 152 determines that all frequency ranges have not been tested, then method 1000 returns to step 1008 where another frequency range is tested.

If, at step 1012, image processing engine 152 determines that all frequency ranges have been tested, then method 1000 proceeds to step 1014 where image processing engine 152 designates that the specific instance of transducer 102 is operating within specifications. The method then ends.

Figure 11:
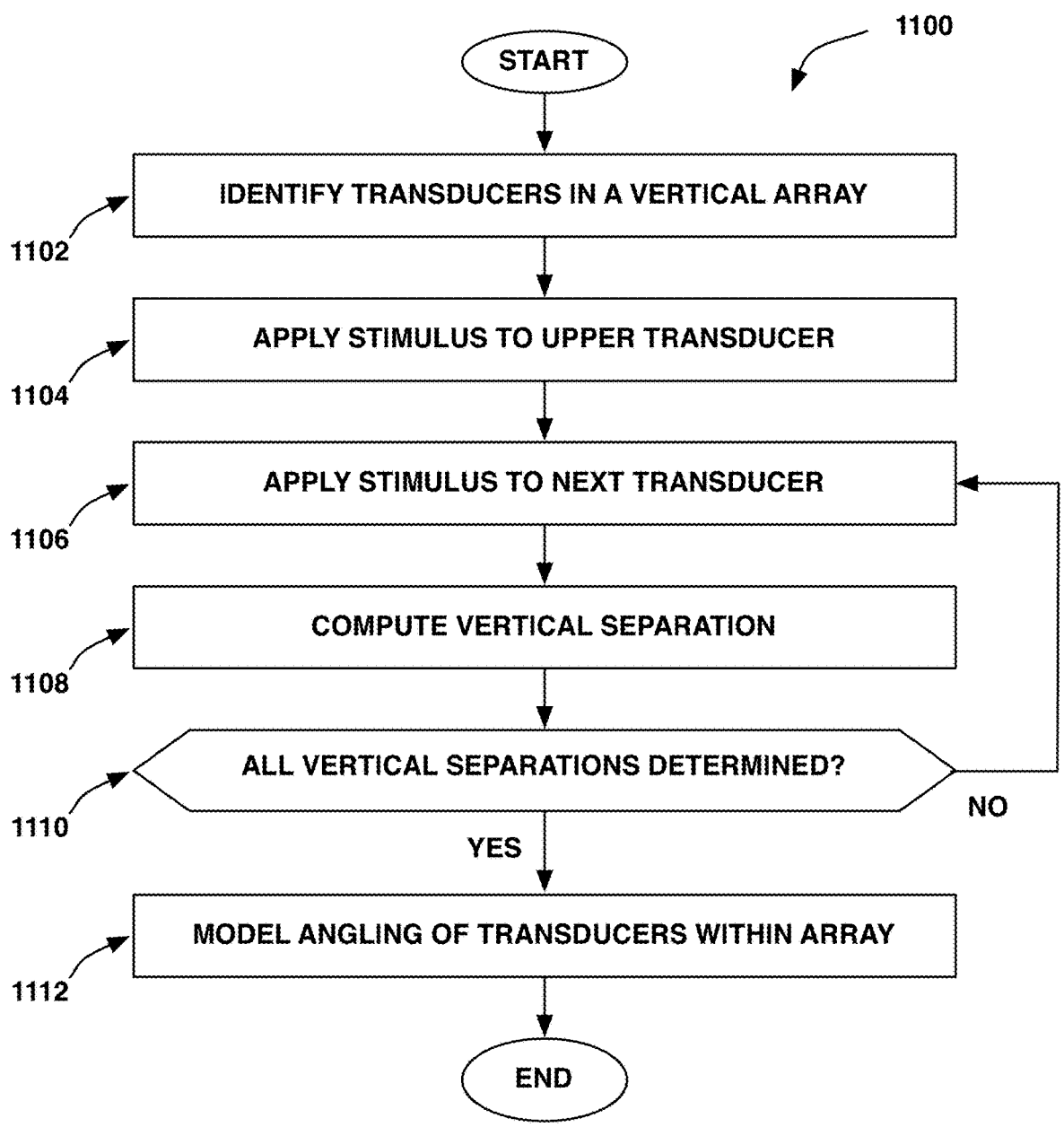
FIG. 11 is a flow diagram of method steps for determining one or more geometric properties of an audio transducer assembly, according to various embodiments.

FIG. 11 is a flow diagram of method steps for determining the geometry of an audio transducer assembly, according to various embodiments. Although the method steps are described in conjunction with the system of FIGS. 1-8, persons skilled in the art will understand that any system configured to perform the method steps, in any order, is within the scope of the present invention.

As shown, a method 1100 begins at step 1102, where amplifier control engine 150 reviews the specifications of system 100 to identify a vertically oriented transducer assembly within system 100. At step 1104, amplifier control engine 150 applies stimulus to the amplifier associated with the transducer that has the greatest vertical displacement within the vertical array. At step 1106, amplifier control engine 150 applies stimulus to the amplifier associated with the transducer that has a lower vertical displacement within the vertical array.

At step 1108, image processing engine 152 computes the vertical separation of the two previously measured transducers. At step 1110, image processing engine 152 determines whether all vertical separations have been computed. If, at step 1110, image processing engine 152 determines that all vertical separations have not been computed, then method 1100 returns to step 1106 to apply stimulus to the amplifier associated with the transducer that has the next lower vertical displacement within the vertical array.

If, at step 1110, image processing engine 152 determines that all vertical separations have been computed, then method 1100 proceeds to step 1112 where image processing engine 152 models the geometry of the vertically oriented array. The method then ends.

Although the method steps are described in conjunction with a vertically oriented transducer assembly, persons skilled in the art will understand that applying any of the above techniques to any array with any non-planar orientation falls within the scope of the present invention.

In sum, an array of audio transducers includes an optical emitter associated with each transducer. Simultaneous stimulation of all transducers illuminates all optical emitters. An imager then creates a map of the transducer array. Stimulation of a single transducer, illuminating the associated optical emitter, creates an optical signature that imaging software uses to determine the position of the transducer within the array. The system then verifies the correspondence between each transducer and the associated driver amplifier by sequential stimulation of each transducer within the array. The system may vary the frequency of the stimulation applied to transducers that include filtering networks, known as crossovers, to validate performance. Further, the system may compute the angles between transducer assemblies that may be deployed in non-planar configurations, thus ensuring that the installation is constructed to specifications.

Advantageously, the techniques disclosed herein allow a substantial reduction in the time required to verify the connectivity of a large scale audio. The disclosed techniques may further be applied to verify the performance of crossovers networks associated with various transducers. Finally, the disclosed techniques may determine the angles between elements in a non-planar assembly of transducers to verify the accuracy of the installation. Thus, the disclosed technique may reduce the time required for verification of the system connectivity from multiple hours to tens of seconds.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A non-transitory computer-readable medium that, when executed by a processing unit, cause the processing unit to analyze connectivity within a sound system, by performing the steps of:

applying a baseline signal to a plurality of amplifiers coupled to a transducer array comprising a plurality of transducers, wherein each transducer in the transducer array is coupled to a different optical emitter that produces a light signal in response to the baseline signal;

capturing a baseline image that indicates a different location associated with each transducer in the transducer array based on respective light signals produced by each optical emitter coupled to each transducer in the transducer array;

generating a three dimensional model of locations of the plurality of transducers from the baseline image;

applying a first signal to a first amplifier in the plurality of amplifiers;

capturing a first image that indicates a first transducer in the transducer array;

determining that the first amplifier drives the first transducer;

comparing the baseline image to the first image to determine a location of the first transducer within the three dimensional model of locations of the plurality of transducers; and generating connectivity data that indicates that the first amplifier is coupled to the first transducer.

2. The non-transitory computer-readable medium of claim 1, wherein:

the step of capturing the baseline image comprises capturing a first data set produced by an imaging device; and the step of capturing the first image comprises capturing a second data set produced by the imaging device.

3. The non-transitory computer-readable medium of claim 2, wherein the imaging device includes at least one of a video camera, a stereo video camera, or a plurality of cameras.

4. The non-transitory computer-readable medium of claim 2, further comprising the steps of:

establishing a reference origin with respect to the imaging device;

establishing a position and orientation of the first image with respect to the reference origin; and determining the location with respect to the reference origin.

5. The non-transitory computer-readable medium of claim 1, wherein the optical emitter comprises an infrared light emitting diode.

6. The non-transitory computer-readable medium of claim 1, wherein the first signal comprises a first range of frequencies, and the first transducer responds to the first range of frequencies.

7. The non-transitory computer-readable medium of claim 1, wherein the first signal comprises a second range of frequencies, and the first transducer does not respond to the second range of frequencies.

8. The non-transitory computer-readable medium of claim 1, further comprising the steps of:

applying a second signal to a second amplifier;

capturing a second image that indicates a second transducer in the transducer array;

comparing the second image to the first image to determine a location of the second transducer within the three dimensional model of locations of the plurality of transducers and with respect to the location of the first transducer within the three dimensional model of locations of the plurality of transducers; and determining an angle between the first transducer and the second transducer based on the three dimensional model.

9. A computer-implemented method for analyzing connectivity within a sound system, comprising:

applying a baseline signal to a plurality of amplifiers coupled to a transducer array comprising a plurality of transducers, wherein each transducer in the transducer array is coupled to a different optical emitter that produces a light signal in response to the baseline signal;

capturing a baseline image that indicates a different location associated with each transducer in the transducer array based on respective light signals produced by each optical emitter coupled to each transducer in the transducer array;

generating a three dimensional model of locations of the plurality of transducers from the baseline image;

applying a first signal to a first amplifier in the plurality of amplifiers;

capturing a first image that indicates a first transducer in the transducer array;

determining that the first amplifier drives the first transducer;

comparing the baseline image to the first image to determine a location of the first transducer within the three dimensional model of locations of the plurality of transducers; and generating connectivity data that indicates that the first amplifier is coupled to the first transducer.

10. The computer-implemented method of claim 9, further comprising:

orienting the first image relative to a device configured to capture the first image; and determining the location of the first transducer relative to the orientation of the first image.

11. The computer-implemented method of claim 9, wherein the three dimensional model represents the first transducer and a second transducer, and wherein the method further comprises determining a first angle between the first transducer and the second transducer based on the three dimensional model.

12. The computer-implemented method of claim 11, wherein generating the three dimensional model comprises:

capturing a second image that indicates the second transducer in the transducer array;

comparing the baseline image to the second image to determine a location of the second transducer within the three dimensional model of locations of the plurality of transducers;

placing a simulated version of the first transducer at a first position in a three dimensional coordinate space; and placing a simulated version of the second transducer at a second position in the three dimensional coordinate space.

13. The computer-implemented method of claim 12, further comprising:

determining an amplitude of a first drive signal that is applied to the first transducer based on the location of the first transducer and based on the first angle; and determining an amplitude of a second drive signal that is applied to the second transducer based on the location of the second transducer and based on the first angle.

14. A system configured to analyze connectivity within a sound system, comprising:

a transducer array, comprising a plurality of transducers, configured to generate audio and optical output within a venue;

an imaging device configured to capture the optical output generated by the transducer array; and a computing device coupled to the transducer array and to the imaging device and configured to:

apply a baseline signal to a plurality of amplifiers coupled to the transducer array, cause the imaging device to capture a baseline image of the optical output of the transducer array that indicates a different location associated with each transducer in the transducer array based on respective light signals associated with each transducer in the transducer array;

generating a three dimensional model of locations of the plurality of transducers from the baseline image;

apply a first signal to a first amplifier in the plurality of amplifiers, cause the imaging device to capture a first image of the optical output of the transducer array that indicates a first transducer in the transducer array, determine that the first amplifier drives the first transducer, compare the baseline image to the first image to determine a location of the first transducer within the three dimensional model of locations of the plurality of transducers, and generate connectivity data that indicates that the first amplifier is coupled to the first transducer.

15. The system of claim 14, wherein the first transducer includes an optical emitter that produces a light signal in response to the baseline signal and produces the light signal in response to the first signal.

16. The system of claim 14, wherein the imaging device is configured to determine the location of the first transducer relative to a reference origin to orient the first image.

17. The system of claim 16, wherein the imaging device resides at the reference origin.

18. The system of claim 16, wherein the imaging device comprises a stereoscopic video camera or a plurality of video cameras configured to capture three dimensional images.

19. The system of claim 16, wherein the first image indicates the reference origin, and the computing device is configured to identify the reference origin within the first image to orient the first image.

20. The system of claim 16, wherein the computing device is further configured to:

apply a second signal to a second amplifier;

cause the imaging device to capture a second image of the optical output of the transducer array that indicates a second transducer in the transducer array;

orient the second image relative to the baseline image;

compare the second image to the first image to determine a location of the second transducer within the three dimensional model of locations of the plurality of transducers and relative to the location of the first transducer and based on the orientation of the second image;

determine an angle between the first transducer and the second transducer based on a three dimensional model.

21. The method of claim 9, wherein each transducer in the transducer array is coupled to the different optical emitter via a supply wire of the transducer.

* * * * *